US008885554B2

(12) United States Patent
Wijting et al.

(10) Patent No.: US 8,885,554 B2
(45) Date of Patent: Nov. 11, 2014

(54) METHOD AND APPARATUS FOR COGNITIVE RADIO COEXISTENCE

(75) Inventors: Carl Wijting, Espoo (FI); Päivi Ruuska, Tampere (FI); Jari Junell, Espoo (FI)

(73) Assignee: Nokia Corporation, Espoo (FI)

( * ) Notice: Subject to any disclaimer, the term of this patent is extended or adjusted under 35 U.S.C. 154(b) by 1143 days.

(21) Appl. No.: 12/785,757

(22) Filed: May 24, 2010

(65) Prior Publication Data

US 2011/0286401 A1 Nov. 24, 2011

(51) Int. Cl.
*H04W 4/00* (2009.01)
*H04W 8/20* (2009.01)
*H04W 16/14* (2009.01)

(52) U.S. Cl.
CPC ............... *H04W 8/20* (2013.01); *H04W 16/14* (2013.01)
USPC .......................................................... 370/328

(58) Field of Classification Search
CPC ....... H04W 84/18; H04W 84/12; H04W 4/06; H04W 80/04; H04W 88/06; H04W 72/04; H04L 12/18; H04L 45/16
USPC .............. 370/329, 310, 328, 338, 310.2, 351, 370/389, 392, 431, 252
See application file for complete search history.

(56) References Cited

U.S. PATENT DOCUMENTS

2007/0223419 A1* 9/2007 Ji et al. ............................ 370/329
2009/0245119 A1 10/2009 Kuffner et al. ................ 370/252
2009/0310567 A1* 12/2009 Gupta et al. ................... 370/331
2010/0003986 A1* 1/2010 Chen .............................. 455/436
2010/0197332 A1* 8/2010 Kyperountas et al. ......... 455/515
2011/0039575 A1* 2/2011 Castillo et al. ............. 455/456.1
2011/0194503 A1* 8/2011 Stanforth ....................... 370/329

OTHER PUBLICATIONS

Harada H. et al., "Research, Development, and Standards Related Activities on Dynamic Spectrum Access and Cognitive Radio", IEEE Symposium on New Frontiers in Dynamic Spectrum, Apr. 2010, pp. 1-12.
Gomes A. et al., "European TV White Spaces Analysis and COGEU use-cases", COGEU (COGnitive radio systems for efficient sharing of TV white spaces in European context), FP7 ICT-2009.1.1, http://www.ict-cogeu.eu/deliverables.html; Jun. 16, 2011, 109 pgs.
Ruuska P. et al., "P802.19.1 System Architecture", IEEE 802.19-10/46r3, Mar. 2010, 12 pgs.
Villardi, G.P. et al., "Coexistence of Multiple Secondary Networks In TVWS", IEEE 802.19-10/0072r0, May 2010, 16 pgs.
IEEE 802.19-09/0047r0, Ingersoll; White Spaces Database, Jul. 2009.
IEEE 802.19-09/0034r2, Wang, Feng, Liu; Media Independent Coexistence for Devices in TV White Spaces, Jul. 2009.

(Continued)

*Primary Examiner* — Anh Ngoc Nguyen
(74) *Attorney, Agent, or Firm* — Harrington & Smith

(57) ABSTRACT

In a non-limiting and exemplary embodiment, a method is provided for sharing secondary cognitive radio resource user related information. A coexistence node receives information on network properties associated with secondary cognitive radio resource users. An upload message is generated and sent, the upload message including for a secondary user database at least information on the received network properties associated with secondary cognitive radio resource users. A location-dependent network map including at least information on network properties is generated. The network map is sent to assist one or more secondary cognitive radio resource users.

14 Claims, 5 Drawing Sheets

(56) References Cited

OTHER PUBLICATIONS

IEEE 802.19-10/0013r0, Kasslin, Ruuska; Coexistence Architecture of 802.19.1, Jan. 2010.

IEEE 802.19-10/0055r02, Kasslin; System Design Document, Mar. 2010.

Application of Nokia Corporation: PCT/EP2009/006180 filed on Aug. 26, 2009 (not public).

Application of Nokia Corporation: U.S. Appl. No. 12/636,640 filed Dec. 11, 2009 (not public).

* cited by examiner

METHOD AND APPARATUS FOR COGNITIVE RADIO COEXISTENCE

FIELD OF THE INVENTION

The present application relates generally to cognitive radio coexistence.

BACKGROUND OF THE INVENTION

Cognitive radio refers to a radio device which can intelligently detect which communication channels are in use by primary users and which are not, and move into vacant channels while avoiding occupied ones.

An important function of cognitive radios is spectrum sensing, generally referring to detecting unused spectrum. Cognitive radios attempt to sense "spectrum holes". A spectrum hole is a frequency range, where the absence of primary users has been determined. Primary users are for example TV stations, wireless microphones or cellular systems. Detecting the absence of primary users is a difficult task and a single detector may make errors when determining whether the spectrum is primary free or not. Efficient spectrum use in the cognitive radio bands also requires coexistence between secondary users.

In passive coexistence methods a cognitive radio selects an operation frequency or transmission time based on sensing the channel. Active coexistence, where cognitive radios can share the characteristics and sensing information with other cognitive radios, is expected to enable more efficient spectrum use than passive coexistence methods.

SUMMARY OF THE INVENTION

Various aspects of examples of the invention are set out in the claim.

According to a first aspect, there is provided a method, comprising: receiving, by a coexistence node, information on network properties associated with at least one secondary cognitive radio resource user, and sending an upload message, the upload message comprising for a secondary user database at least information on the received network properties associated with at least one secondary cognitive radio resource user.

According to a second aspect, there is provided a method, comprising: receiving, by a secondary user database entity, information on network properties associated with one or more secondary cognitive radio resource users for a secondary user database, forming location-dependent network map information at least on network properties, and sending the network map information to assist one or more secondary cognitive radio resource users.

According to a third aspect, there is provided an apparatus comprising at least one processor and at least one memory including computer program code, the at least one memory and the computer program code configured to, with the at least one processor, cause the apparatus at least to perform: receive information on network properties associated with one or more secondary cognitive radio resource users, and send an upload message, the upload message comprising for a secondary user database at least information on the received network properties associated with one or more secondary cognitive radio resource users.

According to a fourth aspect, there is provided an apparatus comprising at least one processor and at least one memory including computer program code, the at least one memory and the computer program code configured to, with the at least one processor, cause the apparatus at least to perform: receive information on network properties associated with one or more secondary cognitive radio resource users for a secondary user database, form location-dependent network map information at least on network properties, and send the network map information to assist one or more secondary cognitive radio resource users.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
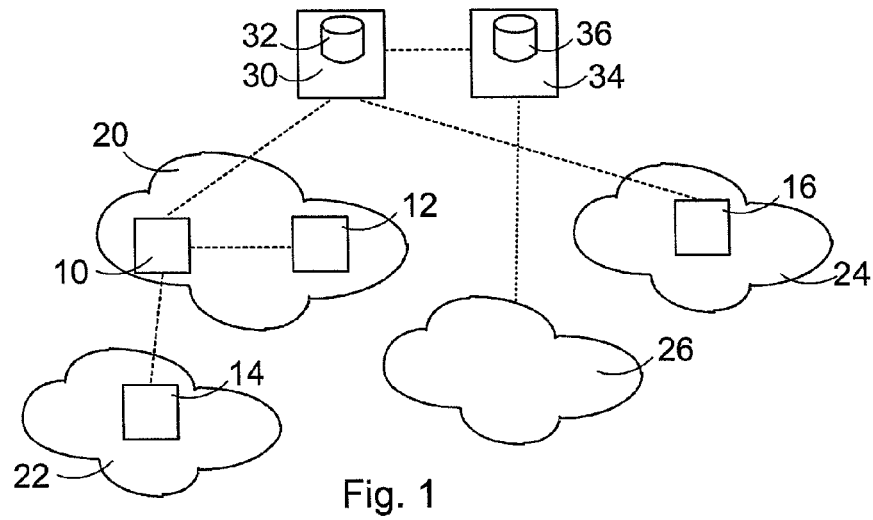
FIG. 1 illustrates a system with cognitive radio resource user devices.

FIG. 1 illustrates entities related to cognitive radio (CR) resource usage according to an example embodiment. The illustrative and simplified system comprises a plurality of wireless networks 20, 22, 24, 26, such as a cellular or non-cellular radio access network (RAN), an IEEE wireless local area network or another network operating on one or more cognitive radio bands, for instance. The wireless network 20, 22, 24 may comprise a number of network elements and terminals connected to the wireless network.

The example system of FIG. 1 comprises at least one coexistence node 10, 16, which is arranged to communicate with at least one database entity 30, 34 storing information on CR users. The coexistence node 10 may be a mesh point or a radio access network element, such as an access point or a base station (controller) serving a number of (end user) terminals. In some embodiments mobile terminals are configured to connect a database entity 30, 34 and may thus function as coexistence nodes. For instance, the coexistence node 16 may be a terminal device connected to the radio network 24.

A system 26, such as a broadcast system, a cellular system, or a short-range radio system, may act as a primary (CR spectrum) user having a priority for a given radio resource. Radio devices of such system may thus function as primary users of a given cognitive radio band.

Devices of a non-primary system function as secondary CR spectrum users, which are in the following description recited simply as secondary users. In the example of FIG. 1, at least devices 12, 14 may function as secondary users. A secondary user refers generally to a node or network which is using spectrum allowed for non-primary use or planning to use such non-primary spectrum, for instance by searching for available frequency channels suitable for operation and/or searching for network opportunities in the area. A secondary user may thus be any device or a set of devices capable of using cognitive radio spectrum flexibly, such as a terminal capable of connecting to one or more networks 20, 22, 24 or forming a new network, such as a mesh point, or a network element serving terminals, such as an access point or a base station. The coexistence node 10 may in one embodiment function as a secondary user.

The secondary users 12, 14 need to be able to detect primary users and avoid causing interference to the primary users. The secondary users 12, 14 may collaborate in spectrum sensing, by sending spectrum sensing information to other nearby secondary users. This may be referred to as distributed CR coexistence. Thus, when a secondary user 12, 14 has made spectrum sensing, it can provide the detection result for other secondary users. Then a receiving secondary user may combine its own detection result and the received detection results. This combined detection result may be used to estimate whether a CR band is available for use.

Information on primary users may also be stored in a database 36, hereafter referred to as a primary user database. This may be referred to as (at least partly) centralized CR coexistence. For instance, the database entity 34 may be a repository service entity arranged to maintain the primary user database 36 and information on primary users. The secondary users 12, 14 and/or the coexistence node(s) 10, 16 may receive information related to spectrum usage by primary users from the primary user database 36.

The key function of coexistence methods is to enable coexistence between different users in a band in a way that the spectrum is used efficiently. The coexistence node 10 may now be configured to receive coexistence related information from secondary users 12, 14 and provide such secondary user coexistence related information for a database 32 on secondary users 12, 14, hereafter referred to as the secondary user database.

In the example of FIG. 1, the database (DB) entity 30, which can be any database access device and may also be referred to as a secondary user DB entity, comprises or is connected to the secondary user database 32. The secondary user DB entity 30 may be responsible for maintaining the secondary user database 32 and store and retrieve information on secondary users 12, 14 in the secondary user database 32. The DB entity 30 may further process the information before storing it in the secondary database 32 and/or before sending information for secondary users 12, 14.

The active sharing of secondary CR user information and application of a specific secondary user database facilitates further efficient CR spectrum use and discovery of secondary CR networking possibilities.

The coexistence node 10 may act on behalf of at least one secondary user 12, 14, such as network elements of a given network, and arrange the communication between secondary users and the secondary user DB entity 30. Thus, it is not necessary for the secondary users 12, 14 to have means for directly communicating with the secondary user DB entity 30, but the coexistence node may (locally) communicate appropriate coexistence related information in an appropriate form with the secondary users 12, 14. It is to be noted that it may be possible that some networks directly connect the secondary user DB entity 30 without using a coexistence node or send and/or receive secondary user information via one or more further secondary user networks and associated coexistence node.

Figure 2:
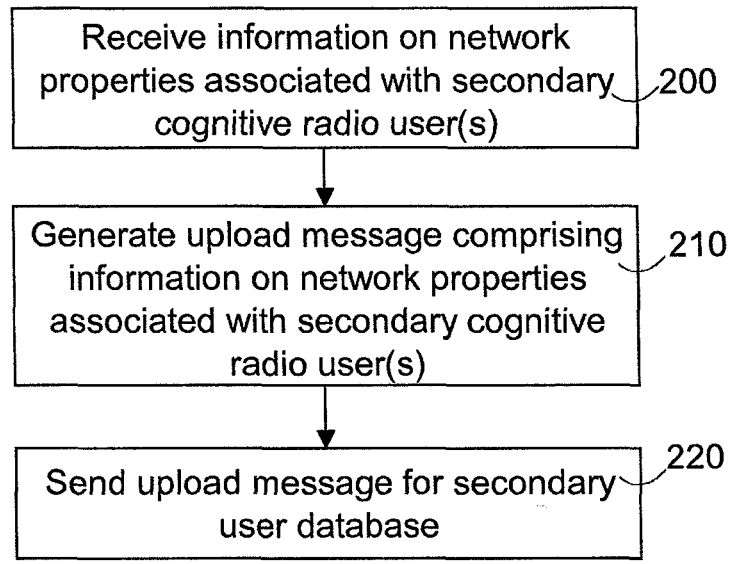
FIG. 2 illustrates upload operations according to an embodiment.

In one embodiment the secondary user DB entity 30 is connected to the primary user database entity 34 to have access to primary user information. Thus, information on primary users may also be provided for secondary users by the secondary user DB entity 30, and it is not necessary to separately connect the primary user database entity 34. FIG. 2 illustrates a method, which may be carried out by the coexistence node 10, for instance. Information at least on network properties associated with nearby secondary cognitive radio resource users 12, 14 is received 200. For instance, the coexistence node 10 may be arranged to gather network property information from one or more radio devices of at least one network functioning as a secondary user. At least some of this information may be stored in a memory of the coexistence node and received in step 200 from the memory.

In step 210 an upload message is generated, the upload message comprising for a secondary user database at least information on the received network properties associated with nearby secondary cognitive radio resource users. The upload message refers generally to any type of message suitable for transferring network property information for storing in the secondary user database. For instance, the coexistence node 10 sends the upload message to the database entity 30 which further process the information and update the secondary user database with the current network situation. It is to be noted that the coexistence node and the secondary user DB entity 30 could be implemented even in a single physical device, such as an access point. Thus, in some cases the sending of the upload message refers to sending of network property information between entities of a single device.

In one embodiment, the coexistence node 10 is arranged to gather, by actively requesting and/or passively receiving, information regarding networks with similar properties or of similar type as the network 20 of the coexistence node 10. For instance, the coexistence node 10 may be arranged to detect identifiers of other similar standard networks and include 210 information associated with such identifiers in the upload message.

In one embodiment the coexistence node 10 is arranged to form a communication map on the basis of the received network properties of neighboring secondary users 12, 14. The communication map represents real information of neighboring cognitive radio networks, which may use the same or different underlying radio access technology. The coexistence node 10 may send the communications map in the upload message to update the secondary user database 32.

The network property information, in a communication map or another form, may include at least one or more of the following identification of a secondary user, for instance a name, an address or another identification of a network, technology or type identification, such as the used standard(s) or access type(s), transmit power, operating frequency, priority information, network location information, compatibility information, network size information, information on provided services, quality of service information such as average access delay, access establishment related information, and utilization characteristics. For instance, the utilization characteristics could include information on channel utilization ratio and/or periodical activity, such as activity start time, active time, interval to next activity start.

Figure 3:
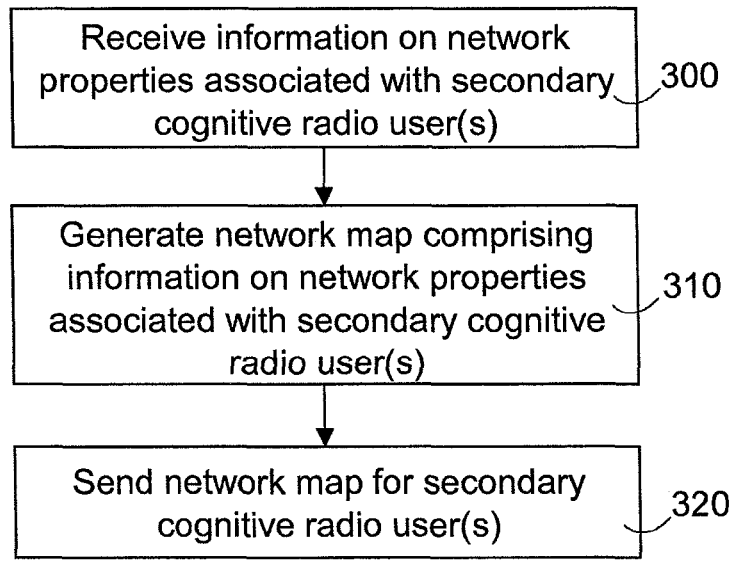
FIG. 3 illustrates a method according to an embodiment.

FIG. 3 illustrates a method, which may be carried out by the DB entity 30, for instance. Information at least on network properties associated with secondary users is received 300 and stored in the secondary user database 34 as such or at least partly in modified form. For instance, the network property information may be received in a form of a communication map illustrated above. A location-dependent network map may be generated 310 on the basis of the received information. The network map refers generally to any form of information indicating at least some networks and network properties in a given area. The network map may be generated in response to a request, whereby there may be further steps of storing the received network property information, receiving a request for location-dependent network map, and retrieving the network property information before entering step 310.

Network map information is sent 320 to one or more secondary users 12, 14 directly or via the coexistence node 10. It will be appreciated that instead of an entire network map only a portion of the network map may be sent. Further, information on configuration actions by the coexistence node 10 based on the network map information may be sent in step 320. The network map information further assists the secondary users 12, 14 to identify and select currently available CR networking options.

The network map may comprise various network property related information to assist secondary users 12, 14. For instance, a secondary user 12, 14 may utilize the network map information to detect currently available cognitive radio networking options or select a channel for a new network or a better channel for existing operation. The network map may comprise at least partly the same information items as indicated above for the communication map. In one embodiment the network map may thus comprise at least one of identification of a secondary user, for instance a name, an address or another identification of a network, technology or type identification, such as the used standard(s) or access type(s), transmit power, operating frequency, priority information, network location information, compatibility information, network size information, information on provided services, quality of service information such as average access delay, access establishment related information, and utilization characteristics. For instance, the network map may simply comprise a list of locally accessible networks. However, it will be appreciated that the network map may comprise various further network related information.

Let us now study some further detailed embodiments related to arranging the secondary user database related functions and applying secondary user data.

The secondary database 32 may store various information related to the secondary users, available networks and radio resources. Secondary users 12, 14 may report their own operation parameters and other characteristics which can be gathered and sent to the DB entity 30 by the coexistence node 30.

When updating secondary user related information, such as network properties, to the secondary user database 32, also further information may be included, such as the origin identifier and location of the information. In some cases an identifier of the information distributor is different from the origin. In addition the secondary user database may have some further information of the environment in question and signal propagation in such environment. The DB entity 30 may be arranged to construct the location dependent information for a secondary user 12, 14 on the basis of the location of the secondary user, information from the primary user database 36, information in the secondary database 32, and/or other information that it may have, such as the propagation models or further information on the environment in question.

Spectrum Management Based on Secondary User Information

The secondary users 12, 14 and the coexistence node 10 may be arranged to send information on spectrum sensing results regarding the current radio environment to update the secondary database 32. These sensing results may include sensed information regarding other secondary users 12, 14 and/or primary users 26. The sensing results may include information such as one or more of estimate of channel occupancy (free, occupied, unknown, for instance), average or peak received signal strength indicator (RSSI) characteristics on the channel, utilization of the activity (high, medium, or low, unknown, for instance), utilization-%, or possible time characteristics of the activity, type of sensed interference (unknown, radio standard type, for instance).

In one embodiment the sensing information, such as one or more of the above information items, for the secondary user database 32 is included in a spectrum sensing map. Each secondary user may form a sensing map of its sensing results, send the sensing map to the secondary user database entity 30 directly or via the coexistence node 10. Alternatively, the coexistence node 10 may form a sensing map including sensing results of a plurality of secondary users and send the sensing map to the secondary user database entity 30. In a still further embodiment the spectrum map is generated by the secondary user database entity 30 on the basis of sensing information from the secondary users.

In one embodiment the database entity 30, managing the spectrum use or storing information which enables secondary spectrum users 12, 14 to find good spectrum opportunities, has (access to) the overall knowledge of the spectrum use situation. The database entity 30 may have access to the primary user information in the primary user database 36, and this primary user information may be delivered to the secondary users and taken into account for spectrum decisions. Based on received location-specific information on secondary users 12, 14, such as the network property information and the sensing information, and primary user information from the primary user database 36, the DB entity 30 may calculate optimal spectrum allocations for different locations, and also determine the areas in which different networks are accessible to the spectrum users 12, 14. With this information the DB entity 30 may assist secondary users on the optimal spectrum resources to use (frequencies, times, etc.), and/or which networks are accessible in the area of the secondary users. Instead of merely assisting in spectrum use, the DB entity 30 may be arranged to command the secondary users to use only the allocated spectrum resources.

In one embodiment a location-dependent spectrum map is generated based on information at least on spectrum usage of secondary users. The spectrum map or a relevant/requested portion of the spectrum map may be sent for one or more secondary users 12, 14. In the example of FIG. 1, the DB entity 30 may be arranged to download the spectrum map to one or more secondary users 12, 14 directly or via the coexistence node 10 in response to a request or automatically. The DB entity 30 needs to know the location for which it constructs the map, i.e. the location of the secondary user 12, 14 which needs the information.

The spectrum map may comprise at least some of the following information for each channel or a set of channels: channel occupancy or utilization (free, high, medium, low, or in %, for instance), technologies (used standards or access technology, for instance), type/source of interference (primary, secondary), level of interference (very high, high, medium, low, very low, for instance), conflict information, and utilization type of interference (possible time periodicity, for instance). Channel information for the spectrum map may be gained by at least one of reported or allocated usage of the channel by a secondary user, use of the channel measured or detected by other means by a secondary user, and primary user information from the primary database 36. The spectrum map may indicate how information (in a portion of) a spectrum map was acquired. The spectrum map may be determined to be valid for a given time interval. The validity may be specified on the basis of time stamps in the received measurements, for instance.

In one embodiment a confidence or reliability indicator is applied to indicate confidence of the secondary user related information. This confidence indicator may be included in the spectrum map and/or the network map, for instance. In one embodiment the confidence indicator indicates how reliably a channel in a spectrum map is classified as busy or free, for instance. The confidence indicator may be dependent on the distance or location of the reporting entity 10, 12 reporting on the use of a channel to the secondary user 10, 12 actually using the channel. For instance, 100% confidence can be indicated in case the channel was used in the very close vicinity of the point where it was reported to be used or if a secondary user 12, 14 reported its own usage. A value between 50 to 90%, for instance, could be indicated for a channel used further away from the point where it was reported to be used. In case a location of an actual user is reported, then also a reporter sending sensing results may report its location for the DB entity 30 or adapt further information, such as the confidence indicator value based on its location. Location or distance information for generating the confidence indicator may be included in the upload message 210 or the sensing map, for instance. Applied sensing method or length of sensing period may also be applied for defining confidence indicator value.

Depending on the network scenario, the secondary user 12, 14 may be a node or a network. Also the coexistence node 10, 16 may function as a secondary user. For instance, if the network is a local network, an access point or a fusion center may upload and access secondary user information on behalf of the whole network. In this case the nodes may not see very different spectrum situation. If the network is a wider area network, secondary user information may be collected by the coexistence node 10, 16 from a plurality of secondary users, because spectrum situation in each location may be very different. In the case that a node is not associated to any network, for instance since it is looking for network opportunities, it may connect the DB entity 30 to obtain secondary user information.

The secondary spectrum user 12, 14 may be arranged to use the information from the secondary user database 32 for discovering network opportunities or spectrum opportunities. For network discovery the secondary user needs to know network technologies, and identification, and on which channels the networks reside. For the spectrum opportunity detection the spectrum user needs to know what type of interference there is in the channels. The spectrum user 12, 14 may request the secondary database entity 30 to provide specifically identified information, such as a specific network map or spectrum map or portion thereof with identified information. However, it is important to note that the information of at least some of such maps may also be combined into one map.

The connection between the secondary users 12, 14, the coexistence node 10, and the DB entity 30 may be of various types. A fixed connection may be used if the secondary user is an access point or a base station, for instance. A wireless connection may be used in case of mobile nodes. A mobile node may connect to the coexistence node 10 by utilizing a wireless local area network access point or a cellular network, for instance. A (secondary) traffic radio from an already established network may be applied. In this case the node may be using the secondary radio with some other node via which it accesses the DB. The secondary user 12, 14 may start to communicate by using the (secondary) traffic radio, and change to another radio after interference information has been received. In this example the secondary user 12, 14 may connect to the DB entity 30 or the coexistence entity 10 by one radio, and change to use another radio on the basis of received secondary user database information.

Centralized Secondary Database Entity Functionality

The DB entity 30 maintaining at least the secondary user database 32 may be a centralized entity which may store, obtain, and share secondary user related information. Thus, discovery of available networking options for secondary users may be centralized. The centralized entity may take care of spectrum allocations on behalf of secondary users 12, 14.

In one embodiment decision making regarding secondary users is performed in connection with the secondary user database 32, for instance by the DB entity 30. The DB entity 30 may comprise a spectrum manager. A secondary user may register to the DB entity 30, and inform the DB entity 30 of required spectrum resources, by sending a resource request to the spectrum manager, for instance. The spectrum manager in the DB entity 30 may then allocate spectrum for the spectrum user, and the spectrum user shall operate accordingly or report of the change in the spectrum situation or spectrum need.

Figure 4:
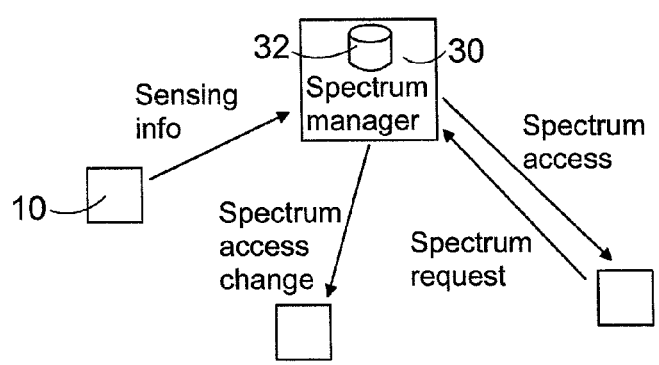
FIG. 4 illustrates examples related to network management.

FIG. 4 illustrates some examples of interaction between secondary users and the secondary user database entity with a spectrum manager. Secondary users may report measurement information, such as information for or in a sensing map and/or communications map regularly or upon change. The coexistence node 10 may act on behalf of one or more secondary users, such as network elements of a given network and arrange the communication between the secondary user(s) and the secondary user DB entity 30. A secondary user may report its spectrum needs or request specific CR band. The DB entity 30 may comprise a spectrum manager calculating optimal spectrum use and authorizing and updating spectrum access to a secondary user, including frequency, TX power, possible time parameters, for instance.

Distributed Secondary Database Entity Functionality

In some embodiments the secondary user DB entity 30 functionality is distributed and a plurality of secondary user databases 32 is maintained. For instance, a secondary user DB entity 30 may reside in each network or each group of networks. In this case such DB entity in each network or group of networks may receive secondary user information from neighboring networks or groups of networks.

Based on its own information and received information, each DB entity 30 can calculate optimal spectrum resources and determine accessible networks for the area of its own networks. A DB entity 30 may be optionally also arranged to perform these functions for networks or group of networks from which it received secondary user information. This approach is useful in shared decision making on spectrum allocation and accessible networks. For instance, a DB entity which first discovers change in spectrum use, which may be caused by introduction of a primary spectrum user or need for more or less resources by some network, for instance, is able to calculate the most optimal spectrum use for all. In this case the DB entity shares the new spectrum allocations instead of just sharing the information that there are conflicts in spectrum use.

In one embodiment decision making regarding secondary users is distributed. The DB entity 30 may operate only as a proxy between networks 20, 22, 24. Decision making regarding secondary user radio resources may be distributed to the coexistence nodes 10, 16 and/or the secondary users 12, 14. The DB entity 30 may assist the relevant nodes 10, 16 and networks to negotiate directly with each other about the spectrum use. The DB entity 30 may determine inter-relations between networks, for instance which networks are on same channel/band and area and should negotiate. For instance, the database entity 30 may be arranged to guide a new network during an initialisation phase to same channels with similar networks, enabling easier channel coexistence. A further example is that a DB entity 30, 34 is arranged to provide primary user information, but regarding secondary user information it may be arranged only to store and provide identification information, such as an address, of the secondary spectrum users nearby with which a secondary user may want to negotiate.

Example Database Structures

The database 32 comprising the secondary user information may be structured in different ways. In one embodiment local secondary user databases (may also be local databases by different service providers) collect the secondary user information and may also synchronize with other databases. A secondary user 12, 14 may be arranged to access a database of its own service provider, for instance. Secondary user databases may also be system (technology) specific and/or area specific. For instance, if a secondary user 12, 14 is interested of spectrum use of wide area users it accesses one secondary user database, and if it is interested of the spectrum use of local area users it accesses another secondary user database.

In one embodiment local secondary user databases upload the relevant information of secondary users in an upper level or global database. Such global database may also comprise primary user information. The local databases may access the global database to obtain information related to primary spectrum use, and possibly the information of the secondary use as well. Thus, the local databases and different service providers may access the secondary user information collected by other local databases and other service providers. Hence, the secondary user database 32 may be operator independent, part of operator's network, or independent and part of an operator's network.

TV White Space System Application Examples

In one embodiment at least some of the above illustrated features are applied in connection with television white space (TVWS) arrangements, specified by the IEEE. For instance, at least some of the presently disclosed features may be applied in connection with the system architecture developed under IEEE 802.19.1. The coexistence node 10 may be a coexistence enabler (CE) and the one or more secondary cognitive radio resource users may be TV white space (network) devices. The secondary user DB entity may be a coexistence manager (CM) arranged to manage the spectrum use of one or more TVWS networks, and negotiate with or command other CMs about the spectrum resources use of their managed network(s). The secondary spectrum user may be a TVWS network, and the CE entity may represent the network to the coexistence manager. The CE entity may collect the secondary user information, such as the network properties, from one or more networks, as illustrated above for the coexistence node 10. The TVWS device comprising the CE entity may also command the network to act according the spectrum allocations received from the CM. Various devices may be adapted to act as secondary TVWS users, for instance: wireless regional area network (WRAN), cellular, WLAN, Femto cell, personal area network (PAN), or a wireless microphone devices.

Figure 5:
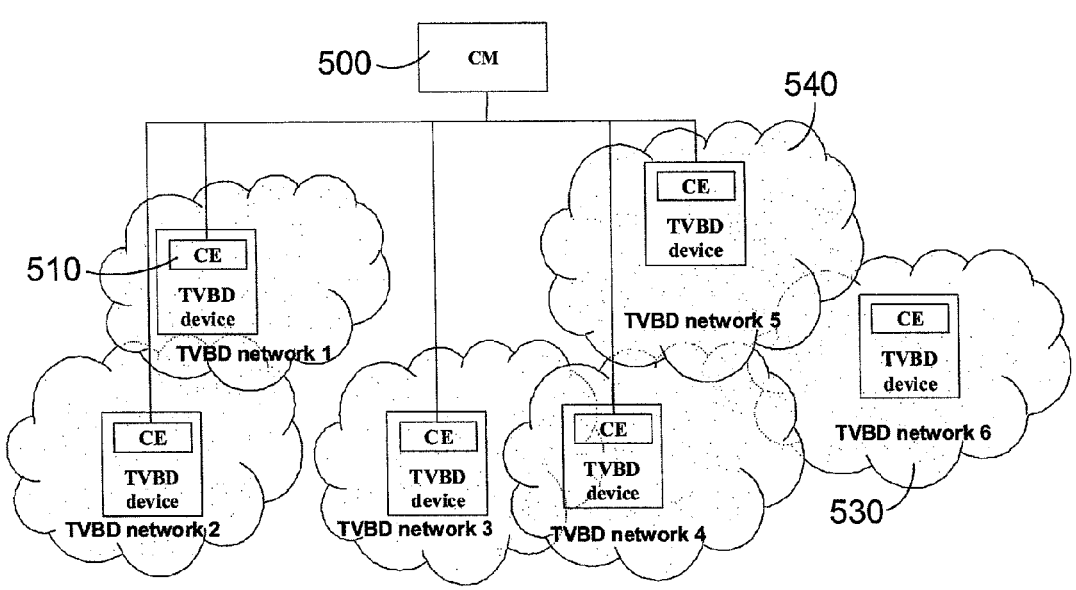
FIGS. 5 and 6 are examples of network arrangements according to some embodiments.

FIG. 5 illustrates an example of a centralized architecture, in which the secondary user database 32 may be included in (or connected to) a CM device 500. A plurality of TVWS networks and respective CE entities 510 are connected to the CM device. Each CE entity 510 may send the secondary user related information, such as the network property information, to the CM, which may determine available networks in each location and may also determine optimal spectrum location in each location. The sixth TVBD network 530 is not connected to the CM 500. If the fifth network 540 is of same technology as the sixth network 530 and/or is able to query network 6 530 operating parameters directly, the CE entity of the fifth network 540 may be arranged to send those parameters to the CM 500 as a communication map. Otherwise characteristics of the sixth network 530 are only detected by sensing and may be included in a sensing map to the CM 500.

Figure 6:
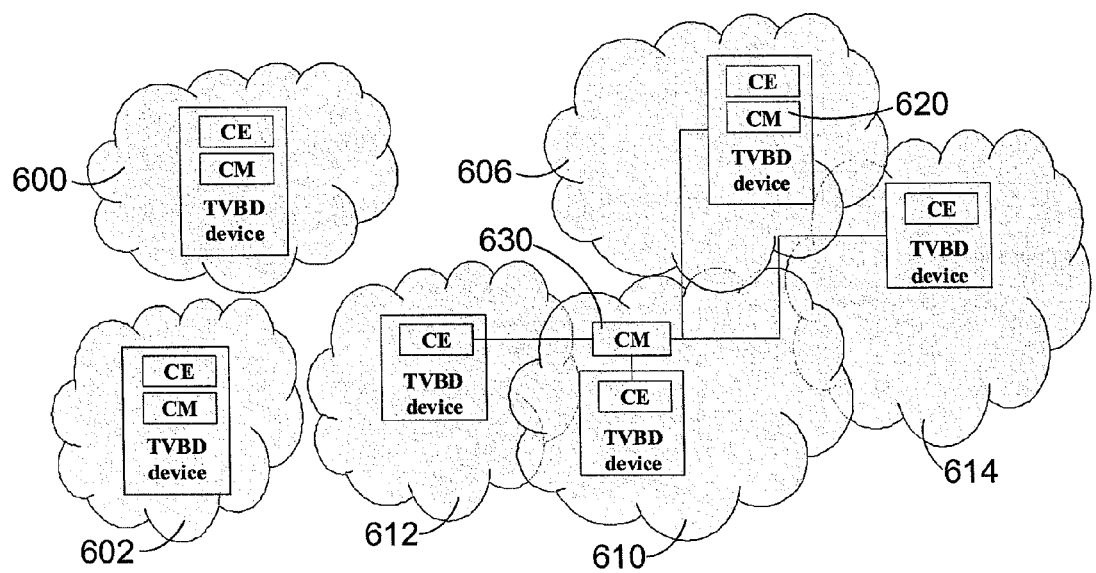

FIG. 6 provides an example, in which some networks 600, 602, 606 in an area are independent and some networks 610, 612, 614 are centrally managed. As illustrated in FIG. 6, in one embodiment independent networks 600, 602, ad 606 may comprise both CE and CM entities, which may be located in a single device. In one embodiment two or more CMs are connected and may share secondary user information. In FIG. 6, the CM 620 may be connected to the CM 630 of the managed networks and can receive the secondary user information from the CM 630. The CM 630 may take into account the spectrum usage and/or network property information send to it, for instance detected characteristics of the independent networks 600 and 602. Thus, networks 612 close to the independent networks 600, 602 may be allocated with resources which networks 1 and 2 should not interfere.

The secondary user database 32 can be included in connection with other services or databases. In one example the secondary user database is arranged in or in association with a media portal or map information database. In addition to updating current location, a terminal may also upload information related to the location such as pictures taken at the location, and download information related to locations, such as restaurants nearby. For instance, spectrum situation or network property information a terminal sees in its location is also information related to the location. The terminal may upload also such secondary user related information to a map server. Similarly, the terminal could also download location related spectrum and network map information which may contain also primary user information. For instance, the map service provider may also function as a white space service provider (WSSP) providing an available channel list, i.e. a list of channels free from registered primary users, to secondary users.

Signalling Examples

Figure 7:
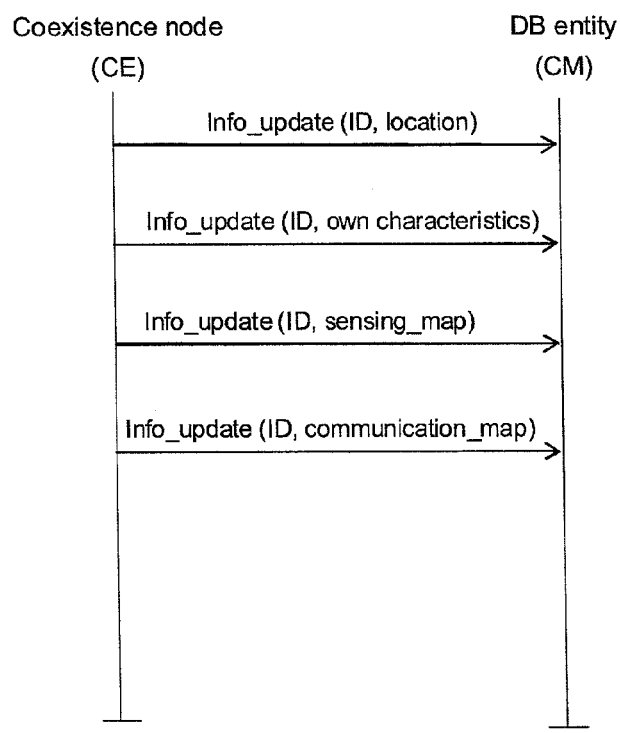
FIGS. 7 to 9 to are flow diagrams according some embodiments.

FIG. 7 illustrates some examples of messages which may be applied to update secondary user related information from the coexistence node 10 to the DB entity 30. An update message may comprise, for at least one secondary user 12, 14, one or more of location information, own characteristics, sensing map, and communication map, associated with identifier(s) of respective secondary users(s). Instead of applying separate messages as illustrated in FIG. 7, updating information may be merged in one or less messages. In case of distributed secondary user databases, the updates may be sent between secondary user DB entities, such as the TVWS CMs.

Figure 8:
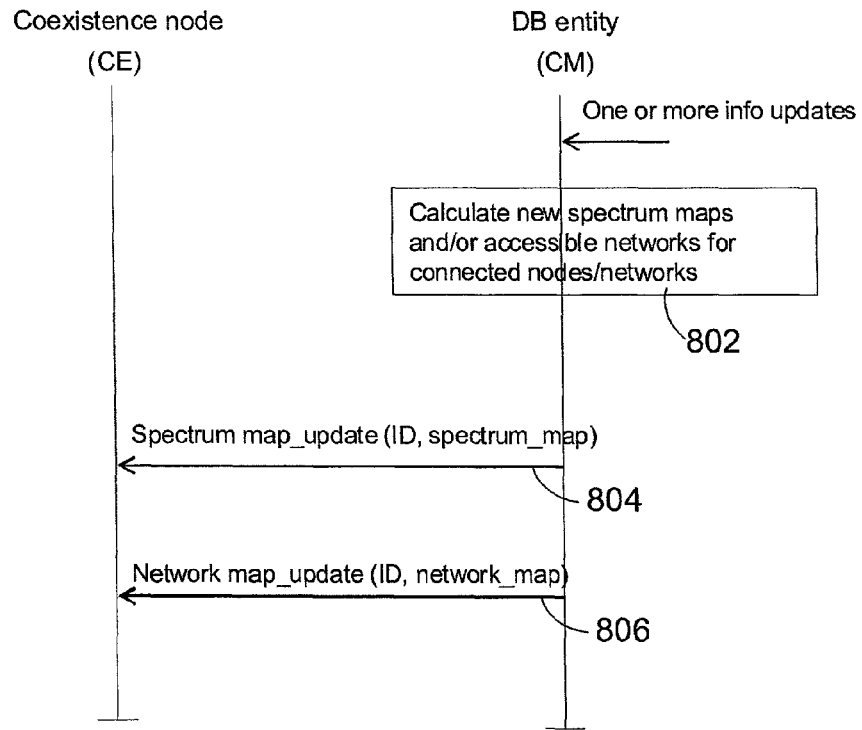

In one embodiment information of the secondary user database is sent automatically. The DB entity 30 may send all or some of the above indicated information, for instance the spectrum map to the coexistence node 10 or other node supporting coexistence in response to a trigger. FIG. 8 illustrates an example of automatic transmission of spectrum map update 804 and a network map update 806 from a DB entity 30, such as a TVWS CM. The secondary user database information may be sent automatically, for instance, in case the spectrum map has changed 802, and/or the change may affect a spectrum user. The DB entity 30 should know the location of a target spectrum user in order to construct the map for the right positions. The DB entity 30 may know the location of the secondary spectrum user if the spectrum user updates its location regularly or upon change. Further, in case of access points, the location typically does not change often.

FIG. 8 illustrates an example of a centralized case in which the information 804, 806 is sent to a coexistence node 10, such as a TVWS CE. In case of distributed DB entities, the updates may be transferred between DB entities, such as TVWS CMs.

Figure 9:
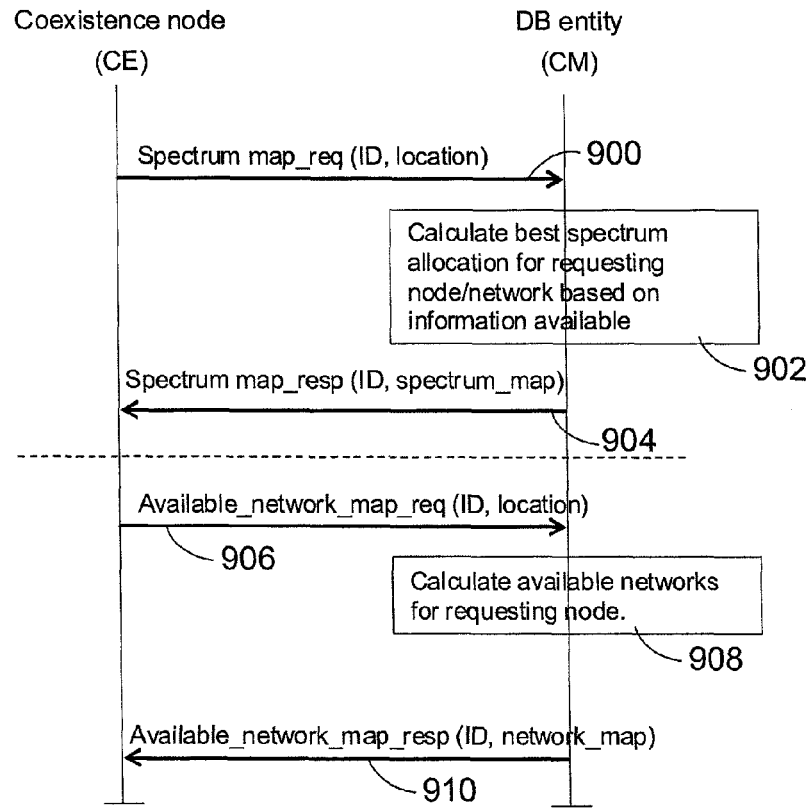

In another embodiment the information from the secondary user database 32 is sent upon request. FIG. 9 illustrates message exchange for generating 902, 908 and sending 904, 910 a spectrum map and a network map upon respective requests 900, 906. Again, in case of a distributed secondary user databases, the updates may be sent between secondary user DB entities, such as the TVWS CMs.

Example Apparatus

Figure 10:
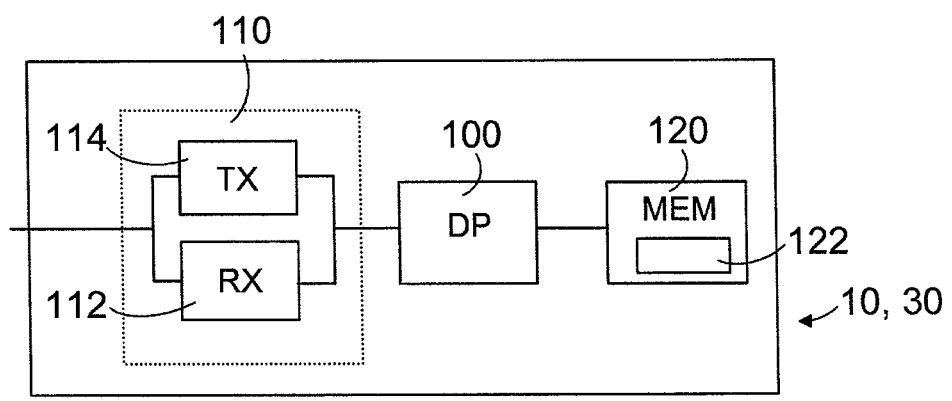
FIG. 10 illustrates an apparatus according to an embodiment.

FIG. 10 is a simplified block diagram of high-level elements of an apparatus according to an embodiment. The apparatus comprises a data processing element DP 100 with at least one data processor, at least one radio frequency transceiver 110 with a transmitter 114 and a receiver 112, and a memory 120 storing a program 122. The apparatus may be configured to function as the coexistence node 10, a secondary user 12, 14, or the DB entity 30 and carry out at least some of the above-indicated functions associated with such entity. Thus, the apparatus may be a database controller, an access point, a base station, a radio access controller, a network manager device, or another type of device with cognitive radio related features, for instance.

The memory 120 may be of any type suitable to the technical implementation context of the respective entity and may be implemented using any suitable data storage technology. The data processing element 100 may be of any type suitable to the local technical environment, and may include one or more of general purpose computers, special purpose computers (such as an application-specific integrated circuit (ASIC) or a field programmable gate array FPGA), microprocessors, digital signal processors (DSPs) and processors based on a multi-core processor architecture, as non-limiting examples.

In general, various embodiments of the presently disclosed features may be implemented by computer software stored in a computer-readable medium, such as the memory 120 and executable by the data processing element 100 of the apparatus, or by hardware (such as an ASIC), or by a combination of software and/or firmware and hardware in the apparatus.

In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 10. A computer-readable medium may comprise a computer-readable storage medium that may be any media or means that can contain or store the instructions for use by or in connection with an instruction execution system, apparatus, or device, such as a computer.

The program 122 may comprise computer program instructions that, when executed by a data processor 100, enable the cognitive radio terminal 10 to operate in accordance with at least some of embodiments of the present invention. The program may comprise computer program code configured to, with the at least one processor, cause the apparatus to perform at least some of the features illustrated in connection with FIGS. 1 to 9.

The apparatus could be in a form of a chip unit or some other kind of hardware module for controlling a cognitive radio device. The hardware module may form part of the device and could be removable. Some examples of such hardware module include a sub-assembly or an accessory device.

For instance, the secondary user 12, 14, the coexistence node 10, or the DB entity 30 of FIG. 1 may comprise the elements of FIG. 10. It will be appreciated that the apparatus may comprise various further elements not discussed in detail herein.

Although the apparatus and the data processing element 100 are depicted as a single entity, different features may be implemented in one or more physical or logical entities. There may be further specific functional module(s), for instance for carrying one or more of the steps described in connection with FIG. 2 or 3.

The apparatus of FIG. 10 may be arranged to use licensed and/or unlicensed bands. It should be appreciated that the above-illustrated embodiments related to sharing secondary user related information may be applied in any current or future standard or non-standard radio system that supports cognitive radios. As non-limiting examples, the apparatus may be configured to operate in or as part of a wireless local area network (WLAN), code division multiple access (CDMA), orthogonal frequency-division multiple access (OFDMA), UMTS terrestrial radio access network (UTRAN) or evolved UTRAN (E-UTRAN) based wireless communication system. The apparatus may be arranged to support one or more CR technologies to communicate secondary user information with another communications device. For instance, the apparatus may be arranged to support any of IEEE cognitive radio related specifications, such as specifications of the IEEE 802.22 or 802.11 working group, Third Generation Partnership Project (3GPP) long term evolution (LTE) cognitive radio features or ECMA-392 cognitive radio features. However, it will be appreciated that the application of the present features is not limited to any particular cognitive radio technologies.

If desired, at least some of the different functions discussed herein may be performed in a different order and/or concurrently with each other. Furthermore, if desired, one or more of the above-described functions may be optional or may be combined.

Although various aspects of the invention are set out in the independent claim, other aspects of the invention comprise other combinations of features from the described embodiments and/or the dependent claim with the features of the independent claim, and not solely the combinations explicitly set out in the claim.

It is also noted herein that while the above describes example embodiments of the invention, these descriptions should not be viewed in a limiting sense. Rather, there are several variations and modifications which may be made without departing from the scope of the present invention as defined in the appended claim.

The invention claimed is:

1. A method comprising:
receiving, by a coexistence node, information on network properties of a neighboring coexisting network which is not connected to a coexistence manager, wherein the network property information comprises at least one of identification of the neighboring coexisting network and operating parameters of the neighboring coexisting network, and
sending an upload message, the upload message comprising for a secondary user database at least said information on the network properties.

2. The method of claim 1, wherein the coexistence node generates a communication map on the basis of the received information on network properties, and the coexistence node sends the communication map in the upload message to the secondary user database.

3. The method of claim 1, further comprising:
receiving, by the coexistence node, information on sensed radio resource usage from one or more secondary cognitive radio users, and
transmitting the information on sensed radio resource usage for the secondary user database.

4. The method of claim 1, wherein the information on network properties comprises at least one of identification of a secondary user, network identification, type or technology identification, transmit power, operating frequency, priority information, location information, compatibility information, network size information, information on provided services, quality of service information, access establishment related information, and utilization characteristics.

5. The method of claim 3, wherein the at least one secondary cognitive radio resource user comprises a television white space device.

6. An apparatus comprising:
at least one processor; and
at least one memory including computer program code,
the at least one memory and the computer program code configured, with the at least one processor, to cause the apparatus at least to perform:
receive information on network properties of a neighboring coexisting network which is not connected to a coexistence manager, wherein the network property information comprises at least one of identification of the neighboring coexisting network and operating parameters of the neighboring coexisting network,
send an upload message, the upload message comprising for a secondary user database at least said information on the network properties.

7. An apparatus comprising:
means for receiving information on network properties of a neighboring coexisting network which is not connected to a coexistence manager, wherein the network property information comprises at least one of identification of the neighboring coexisting network and operating parameters of the neighboring coexisting network, and
means for sending an upload message, the upload message comprising for a secondary user database at least said information on the network properties.

8. The apparatus of claim 6, wherein the at least one memory and the computer program code are further configured, with the at least one processor, to cause the apparatus to generate a communication map on the basis of the received information on network properties, and the apparatus is configured to send the communication map in the upload message to the secondary user database.

9. The apparatus of claim 6, wherein the at least one memory and the computer program code are further configured, with the at least one processor, to cause the apparatus to receive information on sensed radio resource usage from one or more secondary cognitive radio users, and to transmit the information on sensed radio resource usage for the secondary user database.

10. The apparatus of claim 9, wherein the at least one memory and the computer program code are further configured, with the at least one processor, to cause the apparatus to function as a coexistence enabler and the one or more secondary cognitive radio resource users are television white space devices.

11. The apparatus of claim 6, wherein the apparatus is a radio access network device.

12. The apparatus of claim 6, wherein the information on network properties comprises at least one of identification of a secondary user, network identification, type or technology identification, transmit power, operating frequency, priority information, location information, compatibility information, network size information, information on provided services, quality of service information, access establishment related information, and utilization characteristics.

13. A non-transitory computer readable storage medium comprising one or more sequences of one or more instructions which, when executed by one or more processors of an apparatus, cause the apparatus to perform the steps in claim 1.

14. An apparatus comprising:
at least one processor; and
at least one memory including computer program code,
the at least one memory and the computer program code configured, with the at least one processor, to cause the apparatus to at least perform the method of claim 1.

* * * * *